(12) United States Patent
Oud

(10) Patent No.: US 11,713,696 B2
(45) Date of Patent: Aug. 1, 2023

(54) METHOD FOR DRIVING MACHINES IN AN ETHYLENE PLANT STEAM GENERATION CIRCUIT, AND INTEGRATED ETHYLENE AND POWER PLANT SYSTEM

(71) Applicant: TECHNIP ENERGIES FRANCE, Nanterre (FR)

(72) Inventor: Peter Oud, Zoetermeer (NL)

(73) Assignee: TECHNIP ENERGIES FRANCE, Nanterre (FR)

( * ) Notice: Subject to any disclaimer, the term of this patent is extended or adjusted under 35 U.S.C. 154(b) by 0 days.

(21) Appl. No.: 17/616,414

(22) PCT Filed: Jun. 5, 2020

(86) PCT No.: PCT/EP2020/065644
§ 371 (c)(1),
(2) Date: Dec. 3, 2021

(87) PCT Pub. No.: WO2020/245370
PCT Pub. Date: Dec. 10, 2020

(65) Prior Publication Data
US 2022/0356818 A1    Nov. 10, 2022

(30) Foreign Application Priority Data
Jun. 6, 2019   (EP) ..................... 19178729

(51) Int. Cl.
*F01K 13/00*    (2006.01)
*F01K 17/04*    (2006.01)
(Continued)

(52) U.S. Cl.
CPC ............ *F01K 13/006* (2013.01); *F01K 17/04* (2013.01); *F01K 23/06* (2013.01); *C10G 9/36* (2013.01); *C10G 2300/4081* (2013.01)

(58) Field of Classification Search
CPC ........ F01K 13/006; F01K 17/04; F01K 23/06; F01K 13/00; F01K 17/00; F01K 23/067;
(Continued)

(56) References Cited

U.S. PATENT DOCUMENTS 3,765,167 A * 10/1973 Rudolph ................. F01K 25/08
60/39.12
4,172,857 A * 10/1979 Pavilon .................... C10G 9/32
208/127
(Continued)

FOREIGN PATENT DOCUMENTS

EP    3415587 A1    12/2018

OTHER PUBLICATIONS

International Search Report and Written Opin. issued in corresponding PCT application No. PCT/EP2020/065644, dated Oct. 28, 2020.
(Continued)

*Primary Examiner* — Hoang M Nguyen
(74) *Attorney, Agent, or Firm* — Locke Lord LLP; Alan B. Clement; Alicia J. Carroll

(57) ABSTRACT

Method for driving machines, in an ethylene plant steam generation circuit, the method including recovering heat as high pressure steam from a cracking furnace; providing said high pressure steam to at least one steam turbine, wherein the steam turbine is configured to drive a machine, such as a process compressor; condensing at least part of the high pressure steam in a condenser; pumping condensed steam as boiler feed water back to the cracking furnace.

20 Claims, 2 Drawing Sheets

(51) Int. Cl.
 *F01K 23/06* (2006.01)
 *C10G 9/36* (2006.01)
(58) Field of Classification Search
 CPC .......... F01K 11/02; F01K 13/02; C10G 9/36;
  C10G 2300/4081; C10G 9/00; Y02E
  20/18; F22D 11/06; Y02P 30/40
 USPC ................ 60/39.182, 651, 653, 670–681
 See application file for complete search history.

(56) References Cited

U.S. PATENT DOCUMENTS

| | | | | |
|---|---|---|---|---|
| 4,453,323 | A | * | 6/1984 | Nassir ................ F16K 1/222 |
| | | | | 122/7 B |
| 4,479,869 | A | | 10/1984 | Petterson et al. |
| 4,617,109 | A | | 10/1986 | Wells et al. |
| 4,974,411 | A | * | 12/1990 | Bruckner ............. B01J 8/005 |
| | | | | 60/39.12 |
| 2010/0174130 | A1 | | 7/2010 | Spicer et al. |
| 2016/0045841 | A1 | * | 2/2016 | Kaplan ................ C01B 32/05 |
| | | | | 429/49 |
| 2017/0022429 | A1 | | 1/2017 | Van Willigenburg |

OTHER PUBLICATIONS

Bauer G et al:"Das Verbundkraftwerk—Eine Neue Variante Des Kombinierten Kraftwerkes", VGB Kraftwerkstechnik, VGB Kraftwerkstechnik GMBH. Essen, DE, vol. 73, No. 2, Feb. 1, 1993 (Feb. 1, 1993), pp. 120-124, XP000349797,ISSN:0372-5715 pp. 120,121; figures 1-4.

* cited by examiner

METHOD FOR DRIVING MACHINES IN AN ETHYLENE PLANT STEAM GENERATION CIRCUIT, AND INTEGRATED ETHYLENE AND POWER PLANT SYSTEM

CROSS REFERENCE TO RELATED APPLICATIONS

This application is a U.S. National Phase Application filed under 35 U.S.C. § 371, based on the International PCT Patent Application No. PCT/EP2020/065644, filed Jun. 5, 2020, which claims priority from European Application No. 19178729.0 filed on Jun. 6, 2019. The contents of these applications are incorporated herein by references in their entirety.

BACKGROUND

1. Field

The invention relates to a method for driving machines, for example process compressors, in an ethylene plant steam generation circuit, as well as to an integrated ethylene and power plant system.

2. Description of Related Art

A conventional ethylene plant circuit, in particular a steam generation circuit, comprises at least one, and generally six or more, conventional cracking furnace systems, as is for example disclosed in document U.S. Pat. No. 4,479,869. Such a cracking furnace system generally includes a convection section, in which hydrocarbon feedstock is preheated and/or partly evaporated and mixed with dilution steam to provide a feedstock-dilution steam mixture. The system also comprises a radiant section, including at least one radiant coil in a firebox, in which the feedstock-dilution steam mixture from the convection section is converted into product and by-product components at high temperature by pyrolysis. The system further comprises a cooling section including at least one quench exchanger, for example a transfer line exchanger, configured to quickly quench the product or cracked gas leaving the radiant section in order to stop pyrolysis side reactions, and to preserve the equilibrium of the reactions in favour of the products. Heat from the transfer line exchanger can be recovered in the form of high pressure steam. This high pressure steam generated in the cracking furnace from boiler feed water may then be used to generate power. Thereto, the steam generation circuit further comprises at least one, and preferably a plurality of steam turbines, as well as different kinds of machines, such as compressors and pumps, which are driven by said steam turbines. These steam turbines can be of different types, such as for example condensing steam turbines, for example for large machines such as a cracked gas compressor or a propylene or ethylene refrigeration compressor, or back-pressure turbines, for example for relatively small machines. The steam generation circuit further comprises one or more condensers, for example surface condensers which are usually operated under vacuum condition, and at least one boiler feed water pump configured to collect the condensed steam and pump it back to the cracking furnace system as boiler feed water. The circuit may also include a condensate pump and a deaerator between the condenser and the boiler feed water pump where the condensate may be mixed with make-up water and stripped with steam to remove air from the condensate and the make-up water. The boiler feed water collected in the deaerator can then be pumped to the cracking furnace.

Instead of a conventional cracking furnace as described above, high efficiency cracking furnaces have been developed, which can significantly improve firebox efficiency and reduce fuel consumption and $CO_2$ emission by modifying the heat recovery scheme of the furnace. Different kinds of heat recovery processes for such a high efficiency cracking furnace, such as a process with air preheating, with full oxy-fuel combustion, or with a partial oxy-fuel combustion, are for example disclosed in document EP 3 415 587. In addition to heating up a feedstock—dilution steam mixture in a primary transfer line exchanger instead of in the convection section and generating high pressure steam in a secondary transfer line exchanger, the modified heat recovery process of a high efficiency cracking furnace is configured to generate high pressure steam in a boiler coil situated in the convection section upstream of a high pressure steam superheater bank. The boiler coil is configured to generate high pressure steam using flue gas instead of cracked gas, protecting the superheater bank against high temperatures. However, such a high efficiency cracking furnace may also significantly reduce the generation of high pressure steam, while still being able to superheat a feedstock-dilution steam mixture to an optimized radiant coil inlet temperature, which heating step is performed in a primary transfer line exchanger rather than in the convection section. The high efficiency cracking furnace may for example only produce roughly ⅓ of the steam produced in a conventional cracking furnace, which amount may then not be sufficient for the steam turbines to drive the process compressors, such as the cracked gas compressor, or the propylene or ethylene refrigeration compressor. The reduced high pressure steam generation can for example drive only part of the machines, so one or more compressors may then need to be driven by electric motors, for which the required power may be supplied by a power plant, which can be situated near an ethylene plant. Alternatively, the required power might also be supplied by renewable energy such as by wind turbines and/or solar panels. However, high power variable speed driven motors may not be available in the required size, for example for world-scale ethylene plants producing over 1500 kilo-tonnes of ethylene per year. These plants may require electric drivers with a capacity exceeding for example 60 MW for the largest compressors. This will push the limits of what is actually available in the market. At the same time, a high efficiency cracking furnace can also save fuel, for example methane and hydrogen, which increases the amount of fuel that needs to be exported. Hydrogen may for example be used for hydrogenation, but methane is generally combusted, which process still releases $CO_2$ into the atmosphere.

It is an aim of the present invention to solve or alleviate one or more of the above-mentioned problems. Particularly, the invention aims at providing an improved method for driving machines in an ethylene plant circuit, which can reduce the carbon footprint of produced power, i.e. the amount of $CO_2$ emitted per kw of produced power.

SUMMARY

To this aim, according to a first aspect of the present invention, there is provided a method for driving machines, for example process compressors, in an ethylene plant steam generation circuit, which method is characterized by the features of claim 1. In particular, the method for driving machines includes the steps of recovering heat as high pressure steam from a cracking furnace, providing said high pressure steam to at least one steam turbine, the steam turbine being configured to drive a machine, such as a process compressor, condensing at least part of the high pressure steam in a condenser, and pumping condensed steam as boiler feed water back to the cracking furnace. The method also includes the step of recovering heat as high pressure steam from a waste heat recovery boiler of a power plant circuit, and providing, in an inventive way, at least part of the high pressure steam from the power plant circuit to the at least one steam turbine of the ethylene plant steam generation circuit. By providing high pressure steam from the power plant circuit to the at least one steam turbine of the ethylene plant steam generation circuit, a reduction in high pressure steam production in the ethylene plant steam generation circuit due to use of a high efficiency cracking furnace, can be compensated for such that the at least one steam turbine can drive a machine such as a process compressor without the need for an additional electric motor.

Further, excess fuel from the cracking furnace of the ethylene plant steam generation circuit is provided to the waste heat recovery boiler of the power plant circuit for auxiliary firing. In a high efficiency furnace, as described above, not all fuel which is provided to the firebox is used. Due to the modified heat recovery scheme of a high efficiency furnace, up to 30% of fuel may be saved. This excess fuel is present in the cracked gas exiting the high efficiency cracking furnace, and may then be separated, for example by cryogenic distillation, from the cracked gas, so that the fuel can be recovered. This recovered excess fuel may then be provided to the waste heat recovery boiler of the power plant circuit for additional firing to raise the temperature in the waste heat recovery boiler. The excess fuel may for example include methane. Due to the combustion of the methane, $CO_2$ is released into the atmosphere. However, since the combustion in the waste heat recovery boiler is part of a power plant circuit, the amount of power generated by an amount of methane can be increased significantly by increasing the efficiency with which the heat of combustion is converted to electric power, which can reduce the carbon footprint of the produced power, the amount of $CO_2$ emitted per kw of produced power.

The waste heat recovery boiler may preferably be provided with exhaust gas from at least one gas turbine of the power plant circuit. The at least one gas turbine of the power plant may for example include a combustion chamber and an air compressor. Air may be fed via the air compressor to the combustion chamber, to which also fuel gas may be fed. Flue gas, or exhaust gas, including excess air content, can leave the gas turbine with a relatively high temperature and may be sent to the waste heat recovery boiler.

Advantageously, excess fuel from the cracking furnace of the ethylene plant steam generation circuit may be provided to the gas turbine of the power plant circuit for combustion. As explained above, excess fuel may be present in the cracked gas exiting the high efficiency cracking furnace, and may then be separated, for example by cryogenic distillation, from the cracked gas, so that the fuel can be recovered. This recovered excess fuel may then be provided, not only to the waste heat recovery boiler of the power plant circuit, but also, or alternatively, to the gas turbine of the power plant circuit for combustion, resulting in a further reduction of the carbon footprint of the method.

The at least one gas turbine, which is part of the power plant circuit, may preferably be configured to drive a machine, such as a process compressor, of the ethylene plant steam generation circuit. All of the above-mentioned features, in particular providing high pressure steam from the waste heat recovery boiler of the power plant circuit to the at least one steam turbine of the steam generation circuit, providing excess fuel from the firebox to the combustion chamber of the gas turbine of the power plant circuit and to the waste heat recovery boiler of the power plant circuit, and the driving of a process compressor of the ethylene plant steam generation circuit by a gas turbine of the power plant circuit, can all create interconnections between the ethylene plant steam generation circuit and the power plant circuit, and can provide a method for driving a machine, for example process compressors, in an ethylene plant steam generation circuit in combination with a power plant circuit, which can generate approximately 50% more power and reduce the carbon footprint with roughly ⅓ with respect to prior art methods and circuits.

The method may further include the steps of providing at least part of the high pressure steam from the waste heat recovery boiler of the power plant circuit to at least one steam turbine of the power plant circuit, the steam turbine being configured to drive a generator for generating power, condensing at least part of the high pressure steam in a condenser of the power plant circuit, and pumping said condensed steam as boiler feed water back to the waste heat recovery boiler.

The method can in particular be suited for an ethylene plant steam generation circuit including a high efficiency cracking furnace. Firebox efficiency can be defined as the ratio between the heat absorbed by the at least one radiant coil for the conversion of the hydrocarbon feedstock to the cracked gas by means of pyrolysis, which is an endothermic reaction, and the heat released by the combustion process in the combustion zone, based on a lower heating value of 25° C. This definition corresponds to the formula for fuel efficiency 3.25 as defined in API Standard 560 (Fired Heaters for General Refinery Service). The higher this efficiency, the lower the fuel consumption, but also the lower the heat that is available for feedstock preheating in the convection section. In a high efficiency cracking furnace, the firebox can be configured such that that a firebox efficiency is higher than 40%, preferably higher than 45%, more preferably higher than 48%. A normal firebox efficiency of conventional cracking furnaces lies around 40%. If we go above this, the feedstock can no longer be heated up to the optimum temperature as insufficient heat is available in the flue gas: increasing the firebox efficiency from around 40% to approximately 48% would reduce the fraction of the heat available in the convection section from approximately 50-55% to approximately 42-47%. A high efficiency cracking furnace can cope with this reduced availability of heat in the convection section. By raising the firebox efficiency with approximately 20% from around 40% to approximately 48%, approximately 20% of fuel can be saved.

An example of a modified heat recovery scheme for cracking hydrocarbon feedstock in a high efficiency cracking furnace can include a first feedstock preheating step and a second feedstock preheating step. The first feedstock preheating step includes preheating hydrocarbon feedstock by hot flue gasses of a cracking furnace, and the second feedstock preheating step includes further preheating of the feedstock by waste heat of cracked gas of the cracking furnace using a transfer line exchanger before entry of the feedstock into a radiant section of the cracking furnace. Boiler water may be fed from a steam drum of the cracking furnace to a boiler coil in the convection section of the cracking furnace. Boiler water may be heated, and preferably evaporated, by hot flue gasses, and a mixture of water and vapour may be returned to said steam drum. In this way, heat in the effluent is partly diverted to the preheating of the feedstock in order to reach the optimum temperature of the feedstock before entry into the radiant section, while at the same time the heat in the flue gas is diverted to produce high pressure steam. More heat can be diverted to the heating of the feedstock than is diverted to the generation of saturated high pressure steam, which can reduce high pressure steam production in favour of increased feedstock heating. High pressure steam may be generated by waste heat of cracked gas of the cracking furnace using a secondary transfer line exchanger. Depending on the firebox efficiency and thus on the available heat in the cooling section, a secondary transfer line exchanger configured to generate high pressure steam can be placed in series after the main transfer line exchanger to further cool down the cracked gas from the radiant section. While the main transfer line exchanger is configured to heat the feedstock before entry into the radiant section, the secondary transfer line exchanger can be configured to partly evaporate boiler water.

According to a further aspect of the invention, there is provided an integrated ethylene and power plant system characterized by the features of claim 6. Such a system can provide one or more of the above-mentioned advantages.

BRIEF DESCRIPTION OF THE FIGURES

The present invention will be further elucidated with reference to figures of exemplary embodiments. Corresponding elements are designated with corresponding reference signs.

DETAILED DESCRIPTION

Figure 1:
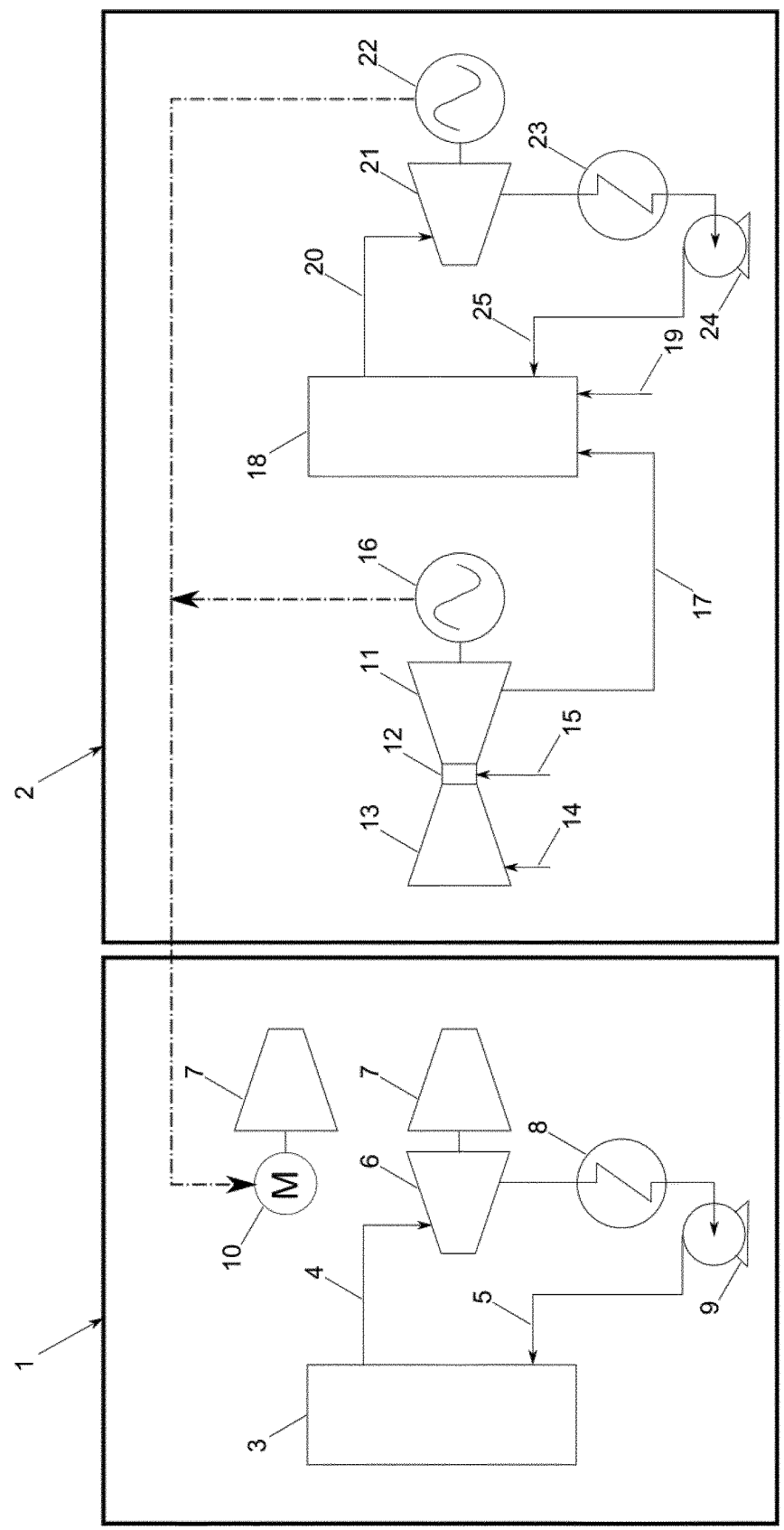
FIG. 1 shows a schematic representation of an ethylene plant steam generation circuit and a power plant circuit.

FIG. 1 shows a schematic representation of an ethylene plant steam generation circuit and a power plant circuit. The ethylene plant steam generation circuit 1 comprises a cracking furnace 3 for converting a hydrocarbon feedstock into cracked gas. The cracking furnace 3 is configured to generate high pressure steam 4 from boiler feed water 5. The steam generation circuit 1 also includes at least one steam turbine 6 configured to be driven by said high pressure steam 4, and at least one process compressor 7, such as a cracked gas compressor, a propylene refrigeration compressor, an ethylene refrigeration compressor or other compressors, configured to be driven by the at least one steam turbine 6. The steam generation circuit 1 further includes at least one condenser 8 configured to condense at least part of the high pressure steam 4, and at least one pump 9 configured to pump the condensed steam to the cracking furnace as boiler feed water. The condenser 8 may for example be a surface condenser operating under vacuum, or a medium-pressure condenser, or any other condenser known to the person skilled in the art. In case of a conventional cracking furnace, enough high pressure steam 4 can be produced for the steam turbine 6 to drive a machine, such as a process compressor. However, if the cracking furnace 3 is a low emission cracking furnace with a revised heat recovery scheme as disclosed and shown in EP 3 415 587, then the low emission cracking furnace cannot produce a sufficient amount of high pressure steam 4 as needed for the steam turbine 6 to drive the at least one compressor 7. One or more of such process compressors 7 of the ethylene plant may then need to be driven by an electric motor 10. Power to drive said electric motor 10 may then be provided by a power plant 2. A conventional power plant 2 may include at least one gas turbine 11 having a combustion chamber 12 with an air compressor 13. Air 14 may be fed via the air compressor 13 to the combustion chamber 12, to which also fuel gas 15 may be fed. Fuel gas 15 can be combusted in the pressurized combustion chamber 12 with a relatively high excess air content. Flue gas generated by said combustion can be let down to ambient pressure over blades of the turbine 11, for example a back-pressure turbine. Forces acting on these blades may be used to drive a generator 16 configured to generate electric power to drive electric machines, such as for example the electric motor 10 configured to drive a process compressor in the ethylene plant. Flue gas, or exhaust gas 17, including excess air content, can leave the gas turbine 11 with a relatively high temperature and may be sent to a waste heat recovery boiler 18. Said boiler 18 may include additional burners, in which fuel 19 may be fired to reduce the excess air and to raise the temperature of the exhaust gas 17. Heat recovered in the waste heat recovery boiler 18 can be used to generate high pressure steam 20, which steam is used to drive a steam turbine 21, for example a condensing steam turbine. Said steam turbine 21 can then drive a generator 22 to generate power, in parallel with the power generated by the generator 16 driven by the gas turbine 11. The power generated by the generator 22 driven by the steam turbine 21 can be sent into a power grid or may also be used to drive electric machines, such as the electric motor 10 of the ethylene power plant circuit. The steam may be condensed under vacuum in a condenser 23, for example a surface condenser of the steam turbine 21. The condensed steam may optionally be first fed to a deaerator preferably using a condensate pump, which step is not shown, and can then be sent back by a boiler feed water pump 24 to the waste heat recovery boiler 18 as boiler feed water 25 to close the power plant circuit.

Figure 2:
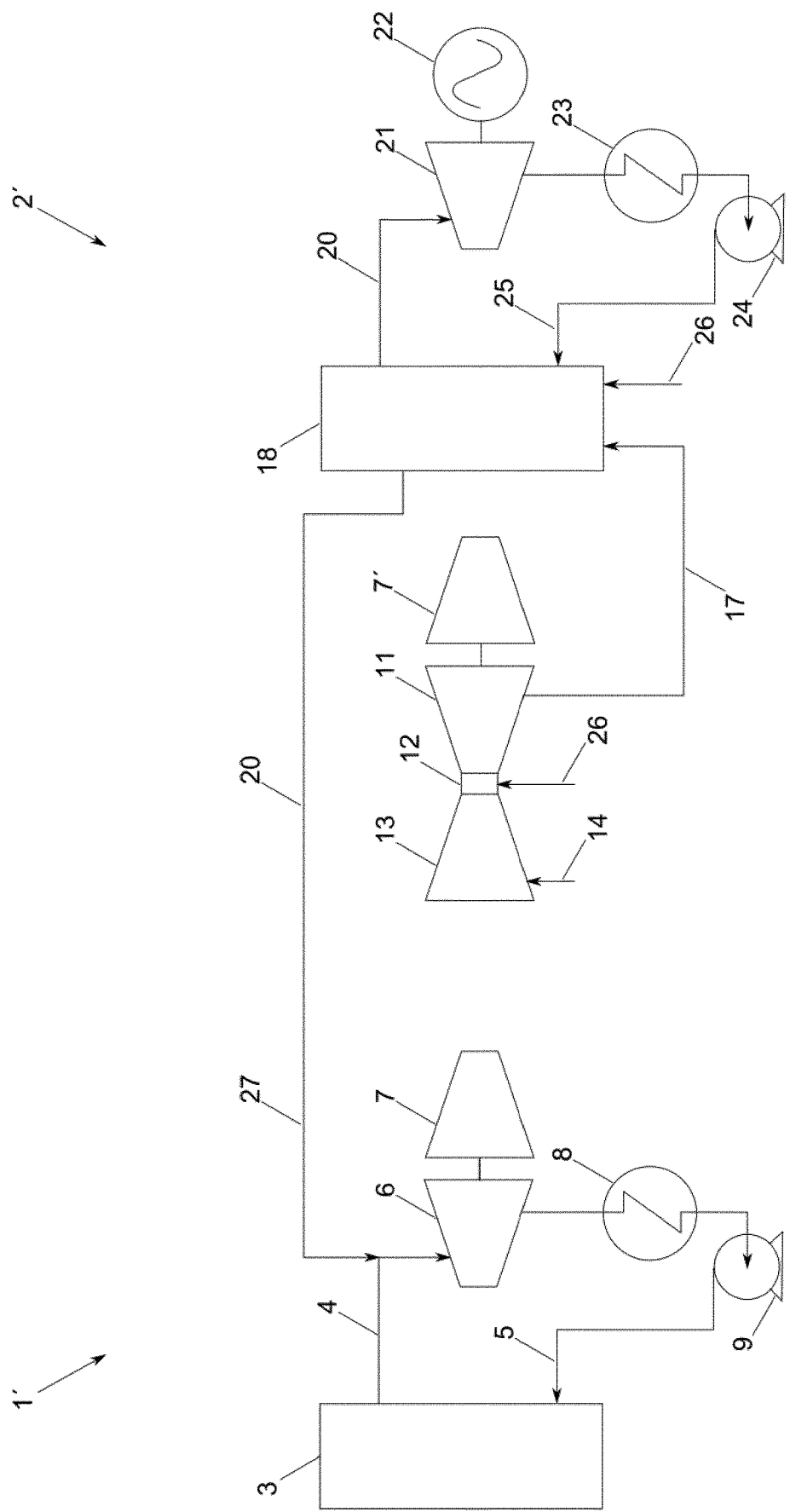
FIG. 2 shows a schematic representation of an integrated ethylene and power plant system according to the invention.

FIG. 2 shows a schematic representation of an integrated ethylene and power plant system according to the invention. Such an integrated system comprises an ethylene plant steam generation circuit 1' configured to generate high pressure steam 4 from boiler feed water 5 for driving at least one machine, such as a process compressor 7, and a power plant circuit 2' configured to generate electric power. The ethylene plant steam generation circuit includes a cracking furnace 3, in particular a high efficiency cracking furnace, for converting a hydrocarbon feedstock into cracked gas. The cracking furnace 3 is configured to generate high pressure steam 4 from boiler feed water 5. The ethylene plant steam generation circuit further includes at least one steam turbine 6 configured to be driven by said high pressure steam 4, at least one process compressor 7 configured to be driven by the at least one steam turbine 6, at least one condenser 8, for example a medium pressure condenser or a condenser operating under vacuum, configured to condense at least part of the high pressure steam 4, and at least one pump 9 configured to pump the condensed steam to the cracking furnace 3 as boiler feed water 5, closing the loop. The power plant circuit 2' includes a waste heat recovery boiler 18 configured to recover heat as high pressure steam 20. In an inventive way, the system further comprises a first connection 27 between the ethylene plant steam generation circuit 1' and the power plant circuit 2' configured to lead at least part of the high pressure steam 20 from the waste heat recovery boiler 18 to the at least one steam turbine 6 of the ethylene plant steam generation circuit 1 to drive said at least one steam turbine 6. In analogy to the power plant circuit 2 of FIG. 1, the power plant circuit 2' of the integrated system can further include at least one steam turbine 21 and at least one generator 22. The circuit 2' may be configured to provide at least part of the high pressure steam 20 from the waste heat recovery boiler 18 to the at least one steam turbine 21 of the power plant circuit 2', and the at least one steam turbine 21 may be configured to drive the at least one generator 22 for generating power. The power plant circuit 2' can further include a condenser 23 configured to condense at least part of the high pressure steam 20, and a pump 24 configured to pump said condensed steam as boiler feed water 25 back to the waste heat recovery boiler 18. The power plant circuit 2' can further include at least one gas turbine 11, being connected to the waste heat recovery boiler 18 such that exhaust gas 17 from the at least one gas turbine 11 is recovered by the waste heat recovery boiler 18. In an inventive way, fuel for additional firing in the recovery boiler 18 to raise the temperature of the exhaust gas 17 can be provided via a second connection (not shown) between the ethylene plant steam generation circuit 1' and the power plant circuit 2' leading at least part of excess fuel 26 from the ethylene plant steam generation circuit 1' to at least one burner of the waste heat recovery boiler 18. In particular, cracked gas exiting a high efficiency cracking furnace 3 of the ethylene plant steam generation circuit 1' may still include fuel gas which can be separated from the cracked gas, for example by cryogenic distillation. Said excess fuel 26 from the ethylene plant circuit can then advantageously be provided to at least one burner of the waste heat recovery boiler 18. A further connection (not shown) between the ethylene plant steam generation circuit 1' and the power plant circuit 2' can be configured to lead at least part of excess fuel 26 from the ethylene plant steam generation circuit 1' to the at least one gas turbine 11, in particular to the combustion chamber 12 of the gas turbine 11, for combustion. The ethylene plant steam generation circuit 1' may further include at least one process compressor 7' which is configured to be driven directly by the at least one gas turbine 11 of the power plant circuit 2', in contrast to the at least one process compressor 7 in FIG. 1, which may be driven by a steam turbine 6 or by an electric motor 10.

The project leading to this application has received funding from the European Union Horizon H2020 Programme (H2020-SPIRE-2016) under grant agreement no 723706.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

REFERENCES

1., 1' Ethylene plant steam generation circuit
2., 2' Power plant circuit
3. Cracking furnace
4. High pressure steam
5. Boiler feed water
6. Steam turbine
7., 7' Process compressor
8. Condenser
9. Pump
10. Electric motor
11. Gas turbine
12. Combustion chamber
13. Compressor
14. Air
15. Fuel
16. Generator
17. Exhaust gas
18. Waste heat recovery boiler
19. Fuel
20. High pressure steam
21. Steam turbine
22. Generator
23. Condenser
24. Pump
25. Boiler feed water
26. Excess fuel
27. First connection

The invention claimed is:

1. Method for driving machines, in an ethylene plant steam generation circuit, the method including:
    recovering heat as high pressure steam from a cracking furnace;
    providing the high pressure steam to at least one steam turbine, wherein the steam turbine is configured to drive a machine;
    condensing at least part of the high pressure steam in a condenser;
    pumping condensed steam as boiler feed water back to the cracking furnace;
    wherein the method also includes:
    recovering heat as high pressure steam from a waste heat recovery boiler of a power plant circuit;
    providing at least part of the high pressure steam from the power plant circuit to the at least one steam turbine of the ethylene plant steam generation circuit; and
    wherein excess fuel from the cracking furnace of the ethylene plant steam generation circuit is provided to the waste heat recovery boiler of the power plant circuit for auxiliary firing.

2. Method according to claim 1, wherein the waste heat recovery boiler is provided with exhaust gas from at least one gas turbine of the power plant circuit.

3. Method according to claim 2, wherein excess fuel from the cracking furnace of the ethylene plant steam generation circuit is provided to the gas turbine of the power plant circuit for combustion.

4. Method according to claim 2, wherein the at least one gas turbine is configured to drive a machine of the ethylene plant steam generation circuit.

5. Method according to claim 1, further including:
    providing at least part of the high pressure steam from the waste heat recovery boiler of the power plant circuit to at least one steam turbine of the power plant circuit, wherein the steam turbine is configured to drive a generator for generating power;
    condensing at least part of the high pressure steam in a condenser of the power plant circuit;
    pumping said condensed steam as boiler feed water back to the waste heat recovery boiler.

6. Integrated ethylene and power plant system, comprising an ethylene plant steam generation circuit and a power plant circuit configured to generate electric power, wherein the ethylene plant steam generation circuit includes:
- a cracking furnace for converting a hydrocarbon feedstock into cracked gas, wherein the cracking furnace is configured to generate high pressure steam from boiler feed water;
- at least one steam turbine configured to be driven by said high pressure steam;
- at least one process compressor configured to be driven by the at least one steam turbine;
- at least one condenser configured to condense at least part of the high pressure steam;
- at least one pump configured to pump the condensed steam to the cracking furnace as boiler feed water;
- wherein the power plant circuit includes a waste heat recovery boiler configured to recover heat as high pressure steam,
- wherein the system further comprises a first connection between the ethylene plant steam generation circuit and the power plant circuit configured to lead at least part of the high pressure steam from the waste heat recovery boiler to the at least one steam turbine of the ethylene plant steam generation circuit to drive said at least one steam turbine; and
- wherein the integrated ethylene and power plant system, further comprises a second connection between the ethylene plant steam generation circuit and the power plant circuit configured to lead at least part of excess fuel from the ethylene plant steam generation circuit to at least one burner of the waste heat recovery boiler.

7. Integrated ethylene and power plant system according to claim 6, wherein the power plant circuit further includes at least one gas turbine, wherein the at least one gas turbine is connected to the waste heat recovery boiler such that exhaust gas from the at least one gas turbine is recovered by the waste heat recovery boiler.

8. Integrated ethylene and power plant system according to claim 7, further comprising a further connection between the ethylene plant steam generation circuit and the power plant circuit configured to lead at least part of excess fuel from the ethylene plant steam generation circuit to the at least one gas turbine for combustion.

9. Integrated ethylene and power plant system according to claim 7, wherein the ethylene plant steam generation circuit includes at least one process compressor which is configured to be driven directly by the at least one gas turbine of the power plant circuit.

10. Integrated ethylene and power plant system according to claim 6, wherein the power plant circuit further includes at least one steam turbine and at least one generator, wherein the circuit is configured to provide at least part of the high pressure steam from the waste heat recovery boiler to the at least one steam turbine of the power plant circuit, wherein the at least one steam turbine is configured to drive the at least one generator for generating power.

11. Integrated ethylene and power plant system according to claim 10, wherein the power plant circuit further includes a condenser configured to condense at least part of the high pressure steam, and a pump configured to pump said condensed steam as boiler feed water back to the waste heat recovery boiler.

12. Integrated ethylene and power plant system according to claim 6, wherein the cracking furnace is a high efficiency cracking furnace including a radiant section, a convection section and a cooling section, wherein the cooling section includes at least one transfer line exchanger configured to preheat feedstock before entry into the radiant section, and wherein a convection section comprises a boiler coil configured to generate saturated steam from flue gas, said boiler coil being preferably located in a bottom part of the convection section.

13. Method according to claim 3, wherein the at least one gas turbine is configured to drive a machine of the ethylene plant steam generation circuit.

14. Method according to claim 2, further including:
- providing at least part of the high pressure steam from the waste heat recovery boiler of the power plant circuit to at least one steam turbine of the power plant circuit, wherein the steam turbine is configured to drive a generator for generating power;
- condensing at least part of the high pressure steam in a condenser of the power plant circuit;
- pumping said condensed steam as boiler feed water back to the waste heat recovery boiler.

15. Method according to claim 3, further including:
- providing at least part of the high pressure steam from the waste heat recovery boiler of the power plant circuit to at least one steam turbine of the power plant circuit, wherein the steam turbine is configured to drive a generator for generating power;
- condensing at least part of the high pressure steam in a condenser of the power plant circuit;
- pumping said condensed steam as boiler feed water back to the waste heat recovery boiler.

16. Method according to claim 4, further including:
- providing at least part of the high pressure steam from the waste heat recovery boiler of the power plant circuit to at least one steam turbine of the power plant circuit, wherein the steam turbine is configured to drive a generator for generating power;
- condensing at least part of the high pressure steam in a condenser of the power plant circuit;
- pumping said condensed steam as boiler feed water back to the waste heat recovery boiler.

17. Integrated ethylene and power plant system according to claim 8, wherein the ethylene plant steam generation circuit includes at least one process compressor which is configured to be driven directly by the at least one gas turbine of the power plant circuit.

18. Integrated ethylene and power plant system according to claim 7, wherein the power plant circuit further includes at least one steam turbine and at least one generator, wherein the circuit is configured to provide at least part of the high pressure steam from the waste heat recovery boiler to the at least one steam turbine of the power plant circuit, wherein the at least one steam turbine is configured to drive the at least one generator for generating power.

19. Method according to claim 1, wherein the steam turbine is configured to drive a process compressor.

20. Method according to claim 2, wherein the at least one gas turbine is configured to drive a process compressor of the ethylene plant steam generation circuit.

* * * * *